(12) United States Patent
Hayashi

(10) Patent No.: US 6,392,683 B1
(45) Date of Patent: May 21, 2002

(54) METHOD FOR MAKING MARKS IN A TRANSPARENT MATERIAL BY USING A LASER

(75) Inventor: Kenichi Hayashi, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/159,203

(22) Filed: Sep. 23, 1998

(30) Foreign Application Priority Data

| Sep. 26, 1997 | (JP) | 9-277921 |
| Nov. 7, 1997 | (JP) | 9-306043 |
| Jan. 16, 1998 | (JP) | 10-018284 |
| Mar. 20, 1998 | (JP) | 10-090605 |
| Aug. 28, 1998 | (JP) | 10-243439 |

(51) Int. Cl.⁷ .................................. B41J 2/435
(52) U.S. Cl. ........................................ 347/224
(58) Field of Search ............... 347/241, 244, 347/256, 258, 262, 224; 359/716, 662; 219/121.18, 121.6, 121.68, 121.69, 121.76, 121.77, 121.85; 8/444; 369/112

(56) References Cited

U.S. PATENT DOCUMENTS

| 3,947,093 A | * | 3/1976 | Goshima et al. ............. 359/716 |
| 4,167,662 A | * | 9/1979 | Steen .................... 219/121.85 |
| 4,315,130 A | * | 2/1982 | Inagaki et al. ........... 219/121.6 |
| 4,530,082 A | * | 7/1985 | Howe et al. ................ 369/112 |
| 5,206,496 A | | 4/1993 | Clement et al. ............. 250/271 |
| 5,466,908 A | * | 11/1995 | Hosoya et al. .......... 219/121.68 |
| 5,567,207 A | * | 10/1996 | Lockman et al. .............. 8/444 |
| 5,656,186 A | * | 8/1997 | Mourou et al. ......... 219/121.69 |
| 6,087,617 A | * | 7/2000 | Troitski et al. ........... 219/121.6 |

FOREIGN PATENT DOCUMENTS

| JP | 59-013588 | 1/1984 |
| JP | 63-068288 | 3/1988 |
| JP | 63-121813 | 5/1988 |
| JP | 3-124486 | 5/1991 |
| JP | 4-71792 | 3/1992 |
| JP | 4-110944 | 4/1992 |
| JP | 6-500275 | 1/1994 |
| JP | 7-76167 | 3/1995 |
| JP | 7-124763 | 5/1995 |
| JP | 7-69524 | 7/1995 |
| WO | WO 92/03297 | 3/1992 |

* cited by examiner

*Primary Examiner*—Hai Pham
(74) *Attorney, Agent, or Firm*—Frishauf, Holtz, Goodman, Langer & Chick, P.C.

(57) ABSTRACT

An object to be marked is prepared. A laser beam of a wavelength that is transmitted by the material from which this object to be marked is formed is focused on the inner portion of said object to be marked, using an fθ lens. A mark is formed in the region of the object to be marked where the laser beam is focused. The mark is positioned inside the object to be marked and does not extend to the surface thereof. Therefore, generation of dirt caused by marking, rupturing of the object to be marked, and the like, can be prevented.

9 Claims, 13 Drawing Sheets

(D2<D1)

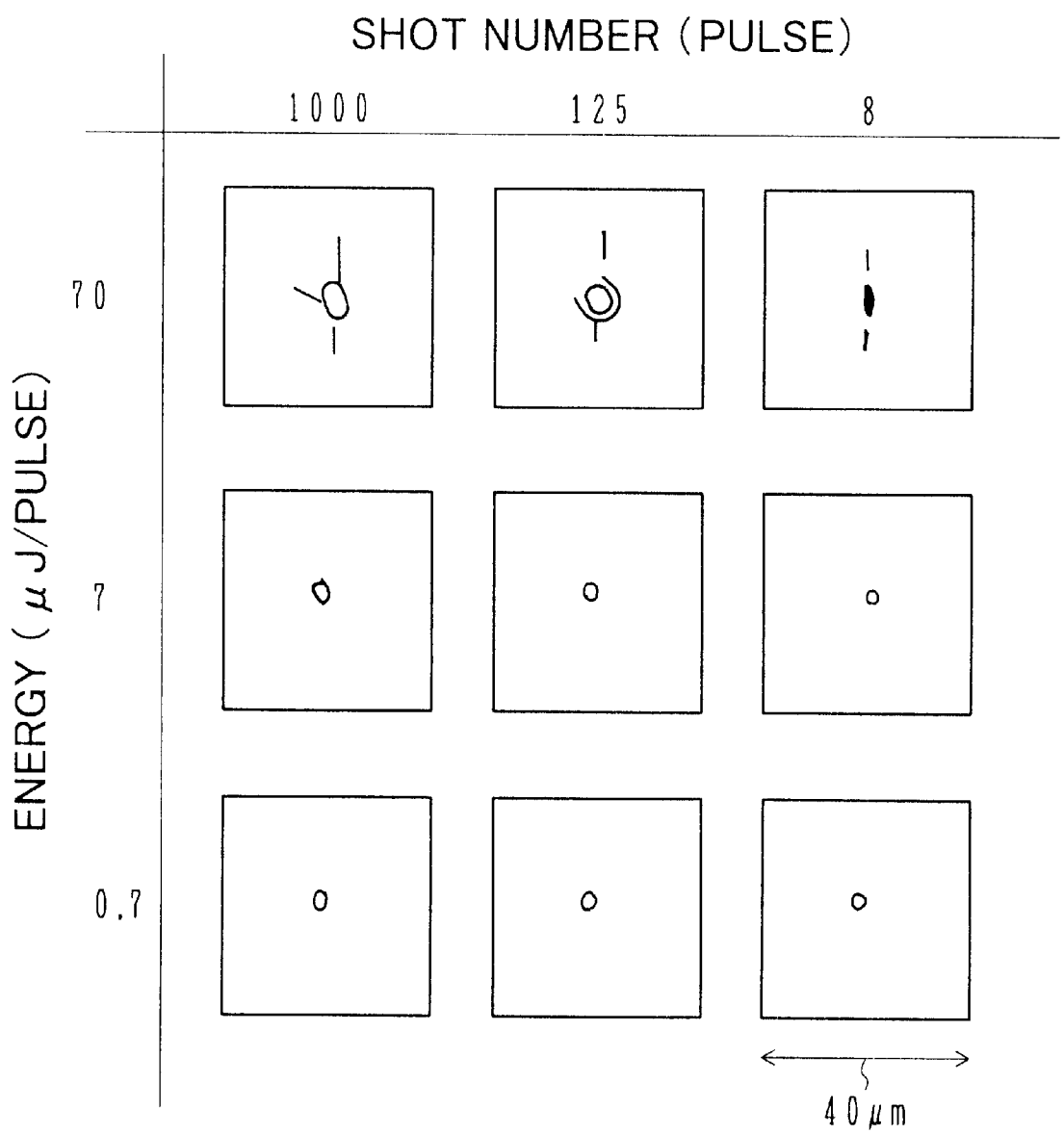

(70 μJ, 8 SHOTS)

(7 μJ, 1000 SHOTS)

METHOD FOR MAKING MARKS IN A TRANSPARENT MATERIAL BY USING A LASER

This application is based on Japanese Patent Applications No. 9-277921 filed on Sept. 26, 1997, No. 9-306043 filed on Nov. 7, 1997, No. 10-18284 filed on Jan. 16, 1998, No. 10-90605 filed on Mar. 20, 1998, and No. 10-243439 filed on Aug. 28, 1998, the entire contents of which are incorporated herein by reference.

BACKGROUND OF THE INVENTION a) Field of the Invention

The present invention relates to a method for making marks in a transparent material, and more particularly, to a method for making marks in a transparent material using laser beam.

b) Description of the Related Arts

Methods for making marks by forming indentations in of an object to be marked, such as a transparent glass substrate, for example, by means of the ablation of a laser beam, are known. Using such methods, there is a risk that minute cracks may occur in the surface of the object to be marked and that fragments thereof may enter into the production line. Furthermore, when making marks by means of the ablation effect, deposits called "debris" adhere to the vicinity of the fabricated marks. The surface of the (glass) substrate must therefor be washed in order to remove the debris.

Japanese Patent JP-B Hei 7-69524 discloses a method for causing a pattern to appear inside a plastic material by focusing laser beam on the inner portion of a transparent plastic to cause burn marks therein. This method is limited to making marks in-materials in which burn marks can be made by a laser beam, such as plastics, for example.

Japanese Patent JP-A Hei 3-124486 discloses a method for making marks by focusing laser beam on the inner portion of a glass, without harming the surface thereof. According to this method, a laser beam is directed onto the inner portion of a glass material whose inner breakdown threshold is 5–20 times the surface breakdown threshold, such that the breakdown threshold is exceeded in the inner portion of the glass without exceeding the breakdown threshold on the surface thereof. In an embodiment of this method, plastic was used as the material to be marked, and melting and degeneration, etc. were produced across a range of 20–40 $\mu$m diameter and 100–250 $\mu$m depth.

However, with glass material having approximately the same breakdown threshold in the inner portion and at the surface thereof, it is difficult to shine a laser beam such that the threshold value of the inner portion only is exceeded. If the threshold value at the surface is exceeded, then marking will occur on the surface.

Japanese Patent JP-A Hei 4-71792 discloses a method for making marks, whereby the inner portion of a transparent material is selectively made opaque by irradiating a laser beam onto the transparent material such that it focuses on the inner portion thereof. According to this method, the transparent material is made opaque by isolated breakdown. In an embodiment of this method, the inner portion of a quartz substrate approximately 2.3 mm thick was made opaque over a range of several 100 $\mu$m, this being identifiable as a white mark when viewed from the surface of the material. Since it is difficult to control the depth of focus of the laser beam accurately, this method cannot be used for making marks on thin transparent materials.

Furthermore, Japanese national publication of translated version Hei 6-500275 suggests the possibility of making three-dimensional marks on a relatively thick material.

Still further, U.S. Pat. No. 5,206,496 discloses a method that comprises directing at a surface of a body a high energy density beam to which a material is transparent, and bringing the beam to a focus at a location spaced from the surface and within the body so as to cause localized ionization of the material.

The aforementioned methods for making marks on the inner portion of a transparent material enable marks to be made on relatively thick transparent materials, but they are not suitable for making marks on thin transparent substrates, or the like.

SUMMARY OF THE INVENTION

It is an object of the present invention to provide a method for making marks which is suitable for making marks on thin transparent substrates.

It is a further object of the present invention to provide a method for making marks which is not liable to generate particles, and the like, such that surface cleaning after marking is unnecessary.

One aspect of the present invention provides a method for making marks comprising the steps of: preparing an object to be marked; and making marks on the inner portion of the object to be marked, by focusing a laser beam of a wavelength that is transmitted by the material from which the object to be marked is formed on the inner portion of the object to be marked, using an f$\theta$ lens.

Since an f$\theta$ lens is used, it is possible to maintain an almost uniform depth from the surface of the object to be marked to the focal point, even when there is variation in the optical axis of the laser beam. Therefore, marks can be made in positions of almost uniform depth within a certain range of the object to be marked.

A further aspect of the present invention provides a method for making marks comprising the steps of: splitting a laser beam emitted from a laser source into a plurality of laser beams ; and making marks by focusing the split plurality of laser beams onto a very small region of the inner portion of an object to be marked, thereby causing degeneration of the focal region of the object to be marked.

A further aspect of the present invention provides a method for making marks comprising the steps of: obtaining a plurality of laser beams; and making marks by irradiating a portion of the plurality of laser beams onto a plate-shaped material having a surface and a rear face, from the surface thereof, irradiating the remainder of the plurality of laser beams onto the plate-shaped material from the rear face thereof, and focusing the beams at a very small region of the inner portion of the plate-shaped material, thereby causing degeneration of the focal region of the object to be marked.

If the energy density of the laser beam in the very small region onto which a plurality of laser beams are focused exceeds a certain threshold value, then the object to be marked degenerates and a mark can be made in the very small region. The region where the threshold value is exceeded can be localized further compared to a case where a single laser beam is used.

A further aspect of the present invention provides a method for making marks, whereby a laser beam having a distribution of light intensity such that the light intensity increases with distance from the centre of the laser beam in an imaginary plane perpendicular to the optical axis thereof is focused on the inner portion of an object to be marked, thereby causing degeneration of the focal region of the object to be marked.

A further aspect of the present invention provides a method for making marks, whereby a laser beam having a circular ring-shaped cross-section perpendicular to the optical axis is focused on the inner portion of an object to be marked, thereby causing degeneration of the focal region of the object to be marked.

Usually, the energy of a convergent laser beam is higher in the central region of the laser beam, so the energy is liable to exceed the threshold value at which the object to be marked is damaged. In the laser beam used in the aforementioned marking method, the light intensity in the central region Is weak or zero compared to the perimeter region thereof, and therefore the region where the threshold value is exceeded can be localized yet further in the direction of the optical axis of the laser beam.

A further aspect of the present invention provides a device for making marks comprising: a laser source; beam splitting means for splitting a laser beam emitted from the laser source into a plurality of partial beams; and a condenser optics system for focusing the plurality of partial beams split by the beam splitting means onto a very small region of the inner portion of an object to be marked.

If the energy density of the laser beam in the very small region where the plurality of laser beams are focused exceeds a certain threshold value, the object to be marked degenerates and a mark can be made in the very small region. The region in which the threshold value is exceeded can be further localized, compared to case where a single laser beam is used.

A further aspect of the present invention provides a device for making marks comprising: a laser source; beam shaping means for shaping a laser beam emitted from the laser source such that the light intensity of the beam falls with distance from the centre thereof in an imaginary plane perpendicular to the optical axis of the beam; and a condenser optics system for focusing the beam shaped by the beam shaping means onto a very small region of the inner portion of an object to be marked.

A further aspect of the present invention provides a device for making marks comprising: laser beam emitting means for emitting a laser beam in such a way that the region of light illumination on an imaginary plane perpendicular to the optical axis of the beam has a circular ring shape; and a condenser optics system for focusing a laser beam emitted from the laser beam emitting means onto a certain region of the inner portion of an object to be marked.

Usually, the energy at the central region of a convergent laser beam is liable to exceed the threshold at which the object to be marked is damaged. Here, since the light intensity in the central region is zero or weak, compared to the perimeter regions of the beam, the region where the threshold value is exceeded can be further localized in the direction of the optical axis of the laser beam.

A further aspect of the present invention provides a method for observing marks comprising the steps of: irradiating illumination light onto a transparent material bearing marks constituted by cracks formed in the inner portion thereof; and observing the light scattered by the marks at a position where illumination light transmitted through the transparent material is not incident.

A further aspect of the present invention provides a device for observing cracks comprising: illumination means for irradiating illumination light onto a transparent material; and light-receiving means located in a position where the illumination light from the illumination means is not incident, and a portion of the light scattered by cracks formed in the transparent material is incident.

Since the illumination light is not incident at the light-receiving means, marks can be observed under conditions providing a good S/N ratio.

A further aspect of the present invention provides a method for making marks comprising the steps of: preparing an object to be marked made from a glass material; and making marks by focusing a laser beam of a wavelength that is transmitted by the material from which the object to be marked is formed on the inner portion of the object to be marked, thereby causing change in the optical properties of the inner portion of the object to be marked.

By causing the optical properties to change, the corresponding region can be made visible. Since it is not necessary to produce cracks, or the like, generation of particles, etc. can be prevented.

A further aspect of the present invention provides a member comprising: a member made from a glass material; and a pattern formed by regions having different optical properties distributed in the object to be marked, wherein each of the regions having different optical properties is long and thin in shape.

The different optical properties are, for example, refractive index changes. The regions having different optical properties can be identified by observing them in their longitudinal direction.

BRIEF DESCRIPTION OF THE DRAWINGS

FIG. 11 is a plan view of marks obtained by marking while changing the energy per pulse of laser beam and number of shots of laser beam;

DETAILED DESCRIPTION OF THE PREFERRED EMBODIMENTS

Before describing an embodiment of the present invention, an evaluation test carried out by the present inventors will be explained. Namely, the fourth harmonic (wavelength 262 nm) of an Nd:YLF laser was illuminated onto the inner portion of a glass substrate using a convex lens having a focal length of 100 mm. The fourth harmonic laser beam had a diameter of 3 mm and the energy was 0.4 mJ/pulse. In this case, it was discovered that a crack approximately 100 μm wide was formed inside the glass substrate in the planar direction of the substrate, and starting from this crack, a further crack approximately 500 μm long was formed in the thickness direction of the glass substrate.

It was also discovered that when making marks in a glass substrate of 1–2 mm thickness, cracks also appeared on the surface of the substrate as well as inside the substrate. When cracks appeared in the surface of the substrate, the mechanical strength of the substrate was lowered, and particles were dispersed from the substrate.

The occurrence of cracks in the surface of the substrate is thought to be due to the following reasons. Firstly, cracks are generated on the basis of indentations and minute fractures already present on the surface of the glass substrate. Secondly, since dirt adhering to the surface of the substrate absorbs laser beams, the amount of laser energy absorbed at the substrate surface is greater than expected. In order to make marks on the inner portion of the substrate without causing cracks to occur on the surface of the substrate, it is thought to be necessary to exercise more precise control of the position of the focal point of the laser beam in the depth direction.

According to a first embodiment of the present invention, it is possible to increase the accuracy of positional control of the focal point of the laser beam. The first embodiment of the present invention is described below.

Figure 1:
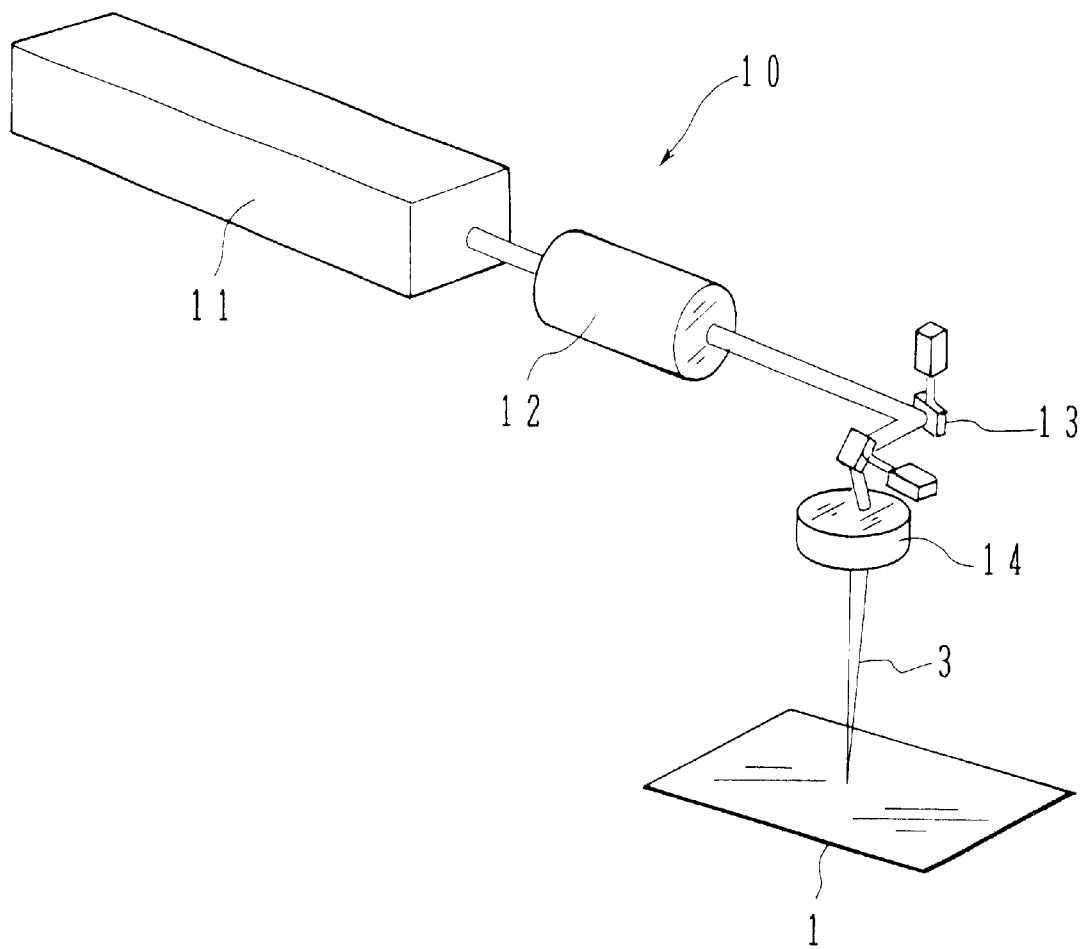
FIG. 1 is an oblique view of a device for making marks used in an embodiment of the present invention.

FIG. 1 is an oblique view of a device for making marks used in a first embodiment of the present invention. The device for making marks 10 comprises a laser source 11, a beam shaper 12, a galvanic mirror 12 and an fθ lens 14. A laser beam emitted from the laser source 11 is shaped by the beam shaper 12, reflected by the galvanic mirror 13 and converged by the fθ lens 14 to form a convergent laser beam 3. The convergent laser beam 3 is shined onto a transparent glass substrate.

The laser source 11 outputs a fourth harmonic (wavelength 262 nm) of an Nd:YLF laser, for example. The pulse width of the output laser beam is approximately 10 ms. An fθ lens 14 having a focal length of 50 mm, for example, is used. For the transparent glass substrate 1, a synthetic quartz substrate of 10 mm thickness, for example, is used.

Figure 2:
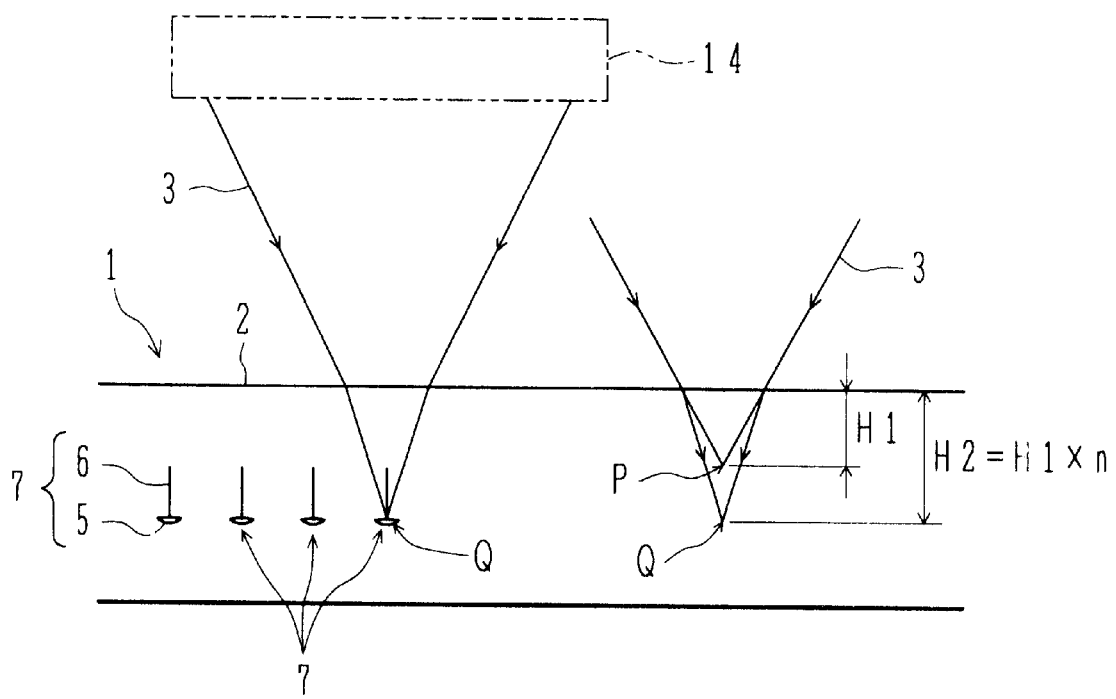
FIG. 2 is sectional view of an object to be marked.

FIG. 2 is a sectional view of a transparent glass substrate for the purpose of illustrating the propagation of the laser beam. If it were assumed that the transparent glass substrate 1 had a refractive index of 1, then the focal point P of the convergent laser beam 3 converged by the fθ lens 14 would lie at a depth of H1 from the substrate surface 2. Since the actual refractive index n of the glass substrate is greater than 1, the depth H2 of the actual focal point Q will be H1×n, due to refraction of the laser beam at the surface of the substrate 1. When making marks on a thin substrate, in particular, the variation in the depth of the focal point due to refraction is of such a magnitude that it cannot be ignored. Therefore, desirably, the positional relationship between the laser beam 3 and the glass substrate 1 is controlled such that the focal point is positioned inside the glass substrate 1, taking the refractive index of the glass substrate 1 into account.

Laser beam 3 is focused at the focal point Q and causes optical damage or optical breakdown to occur at the position of the focal point Q. According to experimentation carried out by the present inventors, a crack 5 in the planar direction of the substrate is produced at focal point Q, and a further crack 6 running from this crack 5 in the direction of the substrate surface was also observed. Cracks 5 and 6 are thought to occur because non-linear absorption of laser beam arises due to the focusing of the laser beam 3. In this way, a mark 7 is formed by cracks 5 and 6. By swinging the galvanic mirror 13 shown in FIG. 1 in order to move the focal point of the laser beam at each shot, it is possible to fabricate a plurality of marks 7 distributed in the planar direction of the substrate 1. Moreover, instead of swinging the galvanic mirror 13, it is also possible to move the substrate 1 in the planar direction.

Since the glass substrate 1 will fracture readily if crack 6 extends to the surface 2 of the substrate, it is necessary to regulate the depth of the focal point Q and the energy of the laser beam 3, such that the crack 6 does not reach the substrate surface 2. The length of the crack 6 is also affected by the focal length of the fθ lens 14.

In order to increase the visibility of the mark 7, desirably, it should be formed to a large size. However, if the mark 7 is formed to a large size, the crack 6 becomes more liable to reach the surface 2 of the substrate. By lowering the energy of the laser beam to reduce the size of the mark 7 and raising the distribution density of the mark 7 in the plane of the substrate, it is possible to increase the visibility of the mark 7 without causing the crack 6 to reach to the substrate surface 2.

Furthermore, since the crack 6 extends from the focal point Q in the direction of the substrate surface 2, at which the laser beam is incident, desirably, the depth H2 of the focal point Q is made deeper than ½ of the thickness of the substrate 1.

Next, the effects of using an fθ lens as the convergent optics system for the laser beam is described.

Figure 3A:
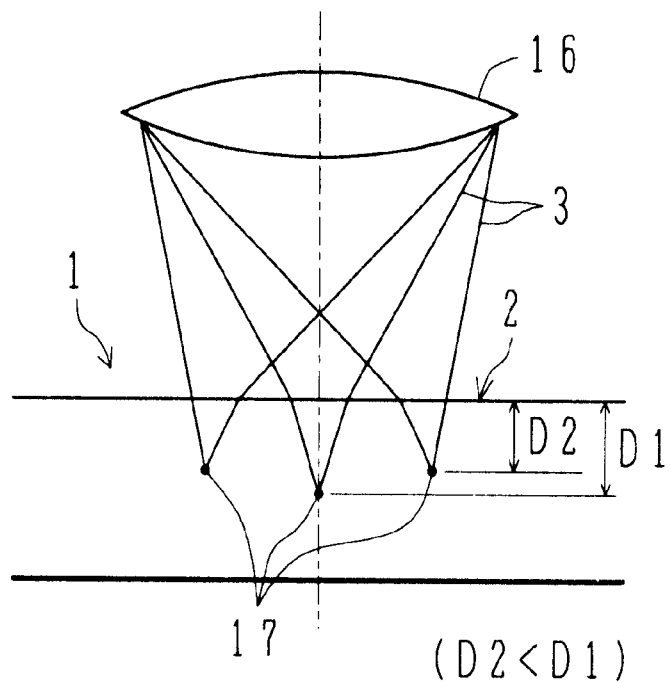
FIG. 3A and FIG. 3B are diagrams illustrating laser beam propagation in a case where a generic convex lens is used and a case where an fθ lens is used, respectively.
Figure 3B:
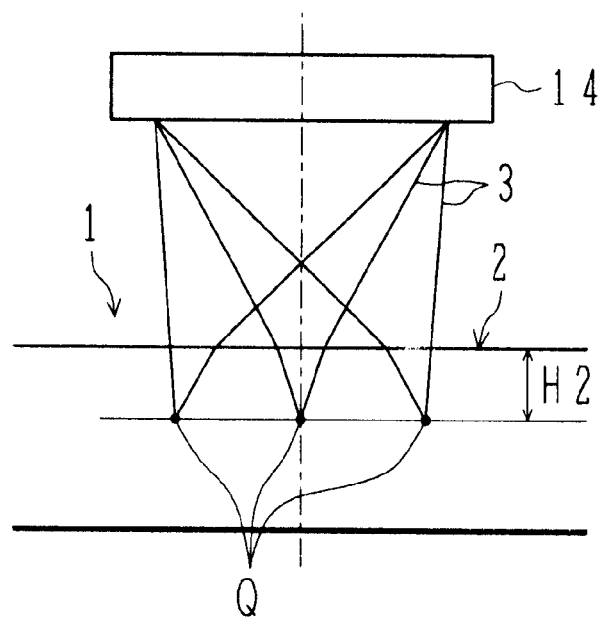

FIG. 3A illustrates the convergence of a laser beam in a case where a generic convex lens is used, and FIG. 3B illustrates the convergence of a laser beam in a case where an fθ lens is used.

As shown in FIG. 3A, when a generic convex lens is used, the focal point 17 moves to a shallower position as the optical axis of the laser beam is inclined with respect to the optical axis of the lens, due to the effect of aberration of the convex lens. Therefore, it is difficult to form marks over a wide range.

As shown in FIG. 3B, when an fθ lens is used, it is possible to maintain the focal point Q at an almost constant depth, even when the optical axis of the laser beam is inclined with respect to the surface of the substrate. Therefore, it is possible to fabricate marks over a relatively wide range in thin glass substrates, without impairing the substrate surface. Moreover, since the amount of movement of the focal point Q in the planar direction is directly proportional to the change in the inclination of the optical axis of the laser beam prior to striking the fθ lens, it is also possible to draw patterns containing little distortion.

In the aforementioned first embodiment, since marks are formed in the inner portion of a glass substrate rather than on the surface thereof, it is possible to prevent the generation of fragments or particles of the glass substrate. Therefore, marking can be carried out in a clean state, and the introduction of particles, and the like, into the production line can be prevented.

In the aforementioned first embodiment, a case involving the fourth harmonic of an Nd:YLF laser was described, but it is possible to use any suitable laser device depending on the object to be processed. For example, for quartz glasses, it is possible to use a laser beam in the infrared spectrum, visible light spectrum or ultraviolet spectrum. For general plate glass which does not transmit ultraviolet light, a laser beam in the infrared spectrum or visible light spectrum can be used.

As the laser source, it is convenient to use a solid state laser which is driven by a laser diode, for instance, an Nd:YAG laser or Nd:YLF laser, which are easy to operate. If an Nd:YAG laser having a wavelength of 1.064 $\mu$m is used, for example, then it is possible to obtain a laser beam in the visible light spectrum by converting the light to a second harmonic by means of a wavelength converter. If the light is converted to a third harmonic or a fourth harmonic, then a laser beam in the ultraviolet spectrum can be obtained. Moreover, if the wavelength of the laser beam used is shortened, then resolution is increased and hence even smaller marks can be fabricated.

Furthermore, by using a pulse laser as a laser source, it is possible to achieve good control in the marking process. In the aforementioned first embodiment, a laser beam with a pulse width of 10 ms was used, but even when a beam with a pulse width of 15 ns is used, it is still possible to make similar marks on a glass substrate. By shortening the pulse width, thermal effects due to laser illumination are reduced, and the position of marks in the depth direction can be kept almost uniform. In order to reduce the influence of thermal effects, desirably, a laser source having a pulse width of 1 ns or less is used.

The aforementioned first embodiment involved making marks on a glass substrate. Next, a modification of the first embodiment, wherein marks are made on a polymethl methacrylate (PMMA) substrate is described. The basic composition of the device for making marks used is the same as that illustrated in FIG. 1. However, an fθ lens 14 having a focal length of 28 mm was used and the second harmonic of an Nd:YLF laser was used for the laser beam. The energy per shot of the laser beam was 0.5 mJ. When marks were made on a 2 mm-thick PMMA substrate, it was possible to form marks on the inner portion of the substrate alone, without harming the surface of the substrate.

The PMMA can be coloured by incorporating a pigment, and an ultraviolet-absorbing material can also be incorporated therein. If marks are being made in PMMA which has been coloured or had an ultraviolet-absorbing material incorporated therein, desirably, a laser beam of a wavelength having a high transmission factor with respect to the PMMA should be used. By using such a laser beam of the a wavelength having a high transmission factor, it is possible to reduce absorption of laser beam in the vicinity of the surface such that the laser beam reaches into the inner portion of the substrate. If the breakdown threshold of the PMMA is exceeded in the inner portion of the substrate, then optical breakdown occurs at this point and a mark can be formed thereby.

Figure 4A:
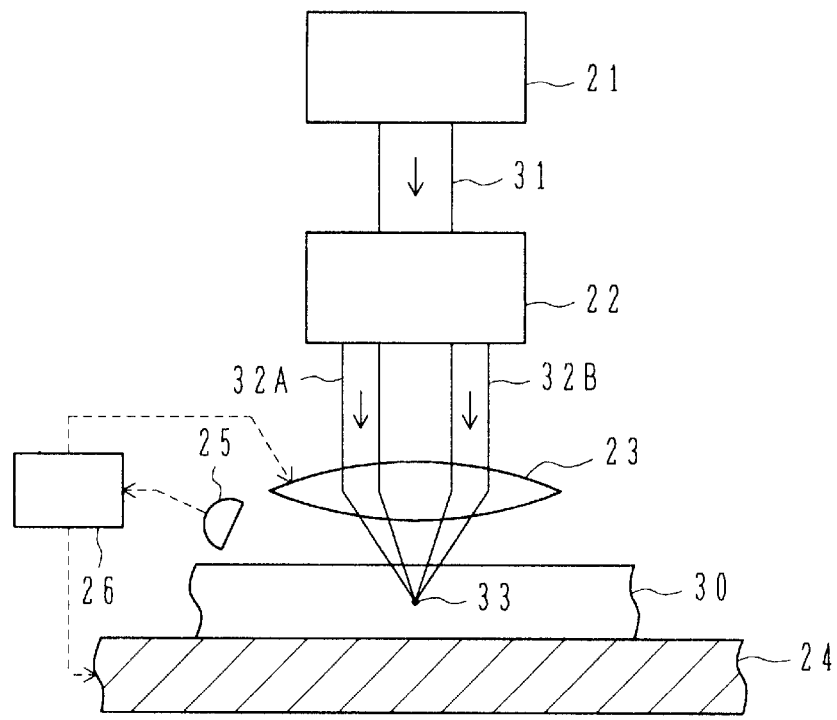
FIG. 4A and FIG. 4B are approximate diagrams of a device for making marks according to a second embodiment of the present invention.

FIG. 4A illustrates the operational principle of a device for making marks according to a second embodiment of the present invention.

A single laser beam 31 is emitted from a laser source 21. This laser beam 31 enters beam splitting means 22, where it is split into two partial beams 32A and 32B. These split partial beams 32A and 32B are then input to a condenser optics system 3. Desirably, the laser beam is split such that there is no energy loss and the sum of the total energy of partial beams 32A and 32B is virtually equal to the energy of laser beam 31.

A holding platform 24 is positioned opposing the condenser optics system 23. An object 30 under processing is mounted on the holding platform 24. The condenser optics system 23 focuses the partial beams 32A and 32B to a very small region 33 in the inner portion of the object 30 under processing. The density of the laser beam in this very small region 33 and its vicinity is increased. If this laser beam density becomes higher than a certain threshold value, then absorption due to optical non-linear effects is thought to occur. This absorption produces optical damage or optical breakdown and the very small region 33 of the object 30 under processing degenerates and becomes visible from the outside. In this way, a mark can be made in the inner portion of the object 30 under processing.

Light emitted from the very small region 33 is measured by means of a photodetector 25. The measurement results from the photodetector 25 are transmitted to position adjusting means 26. Generally, if ablation occurs at the surface of the object 30 under processing, then the intensity of light emission increases compared to cases where optical damage or optical breakdown occur in the inner portion thereof. Position adjusting means 26 adjusts the relative position of the condenser optics system 23 and the holding platform 24 in the axial direction of the laser beam, on the basis of the light emission intensity information gathered by the photodetector 25, in such a way that ablation does not occur at the surface of the object 30 under processing. In this way, marks can be made in the inner portion thereof without causing damage to the surface of the object 30 under processing.

Moreover, by moving the beam splitting means 22 and the condenser optics system 23 in a plane parallel to the surface of the object 30 under processing, marks can be made at prescribed positions in that plane.

Furthermore, since the light is split into two partial beams 32A and 32B and then focused into a very small region 33, the density of the laser beam in relation to the depth direction of the object 30 under processing can be focused into a smaller region than in a case where a single laser beam 31 is focused directly. Therefore, it is possible to shorten the length of the region of degeneration in the depth direction, thereby making it possible to prevent the region of degeneration from reaching the surface of the object 30 under processing.

In order to condense the laser beam into a smaller region in terms of the depth direction of the object 30 under processing, desirably, a lens having as large a numerical aperture as possible should be used as the object lens of the condenser optics system 23.

Moreover, a laser beam which is appropriate for use in combination with the object 30 under processing should be selected. For example, if making marks on a quartz glass, it is possible to use a laser beam having a wavelength in the region for which quartz glass is transparent, namely, the infrared spectrum, visible light spectrum or ultraviolet spectrum. Moreover, if making marks on standard plate glass, then it is possible to use a laser beam having a wavelength in the region for which plate glass is transparent, namely, the infrared spectrum or visible light spectrum. If making marks on a substrate other than glass, for instance, a silicon substrate, then a laser beam in the wavelength region for which a silicon substrate is transparent should be used.

For a laser source 21, it is convenient to use, for example, a solid-state laser device, such as an Nd:YAG laser, Nd:YLF laser, or the like. If an Nd:YAG laser device outputting a laser beam having a wavelength in the infrared spectrum is used, for example, then a laser beam having a wavelength in the visible light spectrum can be-obtained by doubling the wavelength of the laser beam by means of a wavelength converter. Moreover, if the wavelength is quadrupled, then a laser beam having a wavelength in the ultraviolet spectrum can be obtained. The shorter the wavelength of the laser beam used, the greater the spatial resolution of the position to be marked.

Moreover, by using a pulse laser device as a laser source 21, it is possible to suppress temperature rise in the vicinity of the marked area of the object 30 under processing. Therefore, adverse effects due to temperature rise can be avoided, and the marking positions can be aligned uniformly in terms of their depth in the substrate. Desirably, a short pulse width is used. This is because the magnitude of thermal effects is proportional to the square root of the pulse width. In concrete terms, it is desirable to use a laser source oscillating at a pulse width of 1 nanosecond or less.

Figure 4B:
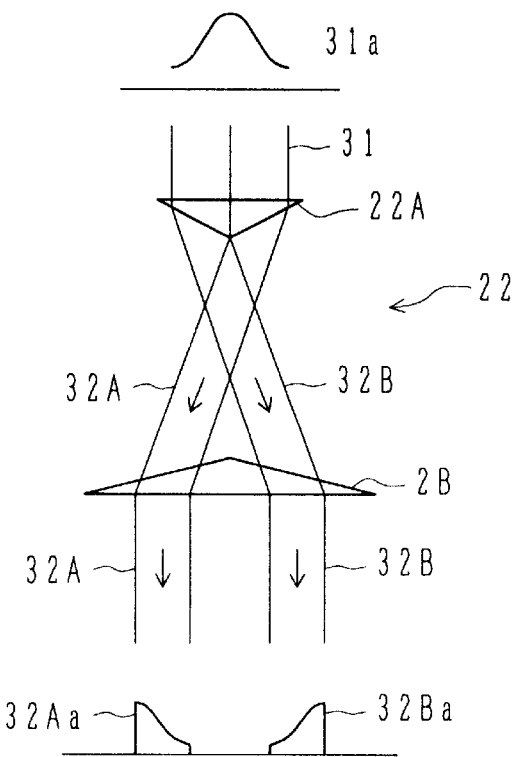

FIG. 4B shows a compositional example of beam splitting means 22. The beam splitting means 22 comprises a first prism 22A and a second prism 2B each having an isosceles triangular cross-section. The first and second prisms 22A and 2B have the same apex angle as each other, for example, 120°, and are positioned such that their respective base surfaces lie mutually in parallel and their respective corners corresponding to their apices face each other in a parallel fashion.

The laser beam 31 is incident perpendicularly on the base surface of the first prism 22A. The distribution of intensity in the direction perpendicular to the optical axis of the laser beam 31 is indicated by the curve 31$a$. The light intensity becomes a maximum in the centre and gradually declines away from the centre.

The laser beam emitted from the pair of oblique faces of prism 22A is split into two partial beams 32A and 32B. The partial beams 32A and 32B are incident respectively at the two oblique faces of prism 2B. Two parallel partial beams 32A and 32B are emitted from the base of the prism 32B.

In this way, by using a pair of Isosceles triangle-shaped prisms, a single laser beam 31 can be split into two partial beams 32A and 32B. Moreover, in the case of FIG. 4B, the central portion of laser beam 31 is positioned on the outer sides of the partial beams 32A, 32B, and the perimeter region of the laser beam 31 is positioned on the inner sides of the partial beams 32A and 32B. Therefore, the distribution of light intensity in the partial beams 32A and 32B will with the distance from the centre of the two partial beams 32A and 32B, as illustrated by curves 32A$a$ and 32B$a$.

In this way, the light intensity on the outer sides of the two partial beams 32A and 32B is higher than the light intensity on the inner sides thereof. Therefore, when the two partial beams are focused onto a very small region, it is possible to restrict the region in which the light intensity exceeds the threshold value to an even smaller region.

Desirably, the angle of incidence of each partial beam 31 at the surface of the object 30 under processing should be adjusted such that it equals the Brewster angle. By setting it to the Brewster angle, damage due to reflection can be reduced.

Next, a third embodiment is described with reference to FIG. 5A and FIG. 5B.

Figure 5A:
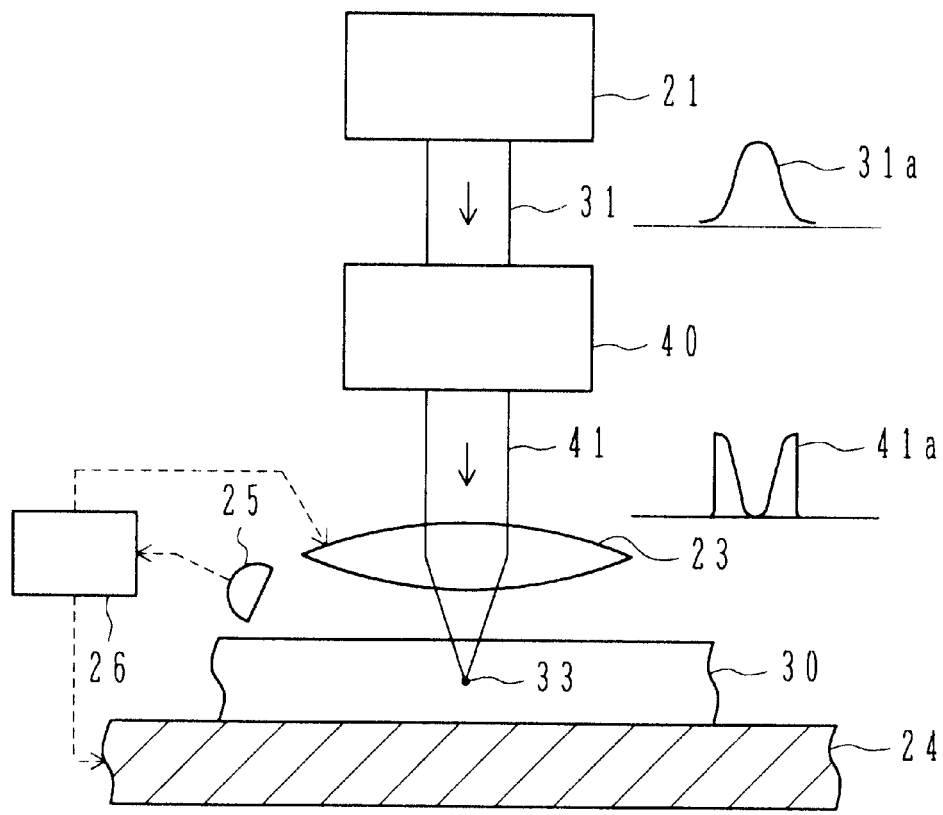
FIG. 5A and FIG. 5B are approximate diagrams of a device for making marks according to a third embodiment of the present invention.

As shown in FIG. 5A, in the third embodiment, beam shaping means 40 is used instead of the beam splitting means 22 in FIG. 4A. With this exception, the composition is similar to that in FIG. 4A.

The distribution of light Intensity in the direction perpendicular to the optical axis of the laser beam 31 emitted from the laser source 21 is more intense in the centre and becomes weaker with distance from the centre, as illustrated by curve 31$a$.

Beam shaping means 40 shapes the laser beam 31 and outputs a laser beam 41 having a distribution of light intensity wherein the light intensity is weaker in the centre and grows stronger as the position moves away from the centre. The distribution of light Intensity of the laser beam 41 is indicated by curve 41$a$.

If the laser beam 31 is focused directly in this state, the light intensity in the vicinity of its optical axis will exceed the threshold value over a relatively large range in the direction of its optical axis. On the other hand, if a beam which has a weak light intensity in the vicinity of its optical axis, such as laser beam 41, is focused, the light intensity can readily be controlled such that it exceeds the threshold value only over a small range in the direction of the optical axis.

Therefore, it is possible to make marks over only a short range in the direction of the thickness of the object 30 under processing, and hence cracks can be prevented from reaching the surface thereof.

In order to focus the laser beam into an even smaller region with respect to the depth direction of the object 30 under processing, desirably, a lens having as large a numerical aperture as possible is used as the object lens in the condenser optics system 23.

Figure 5B:
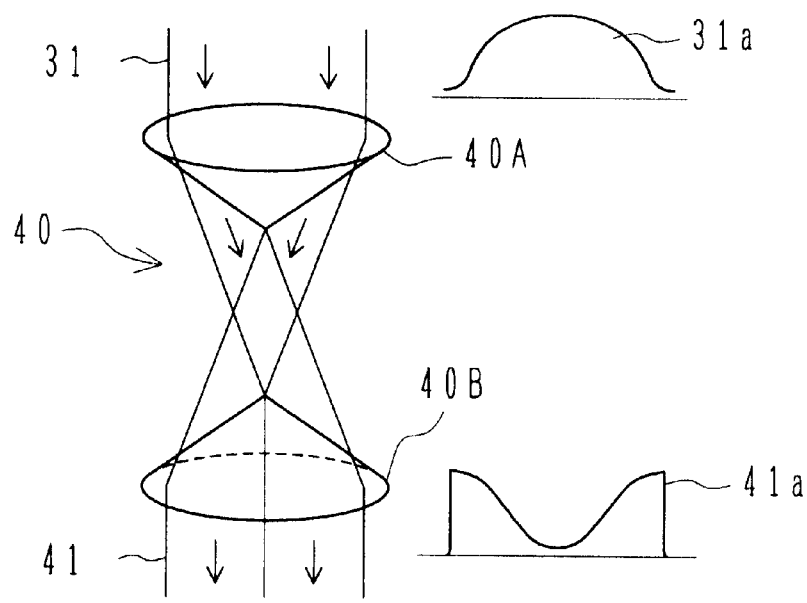

FIG. 5B shows an example of the composition of beam shaping means 40 used in the third embodiment. Beam shaping means 40 comprises a first conical prism 40A and a second conical prism 40B. The first and second conical prisms 40A and 40B are positioned such that they share a common central axis and their respective apices are mutually opposing.

The laser beam 31 is incident perpendicularly at the base of the first conical prism 40A. The gap between the first conical prism 40A and the second conical prism 40B is adjusted such that the light rays on the outer sides of the laser beam 31 are incident at the region of the apex of the second conical prism 40B. The light intensity of the laser beam 41 emitted from the base of the second conical prism 40B is stronger in the central region thereof and gradually becomes weaker away from the centre.

In this way, by using a pair of prisms, it is possible to form a laser beam having a weaker light intensity in the central region thereof.

Next, a fourth embodiment is described with reference to FIG. 6A and FIG. 6B.

Figure 6A:
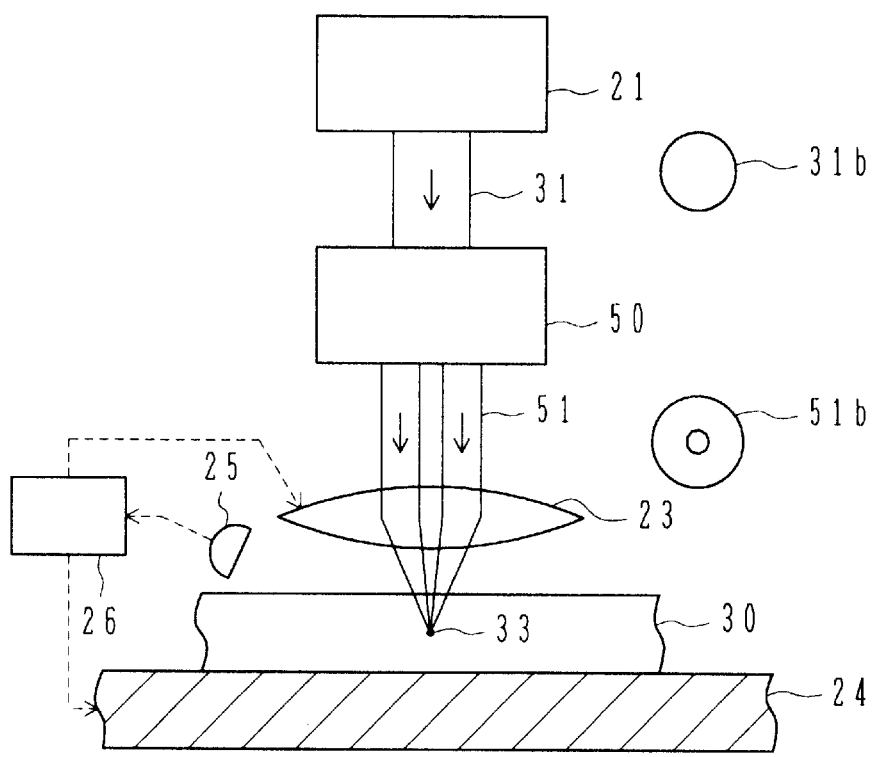
FIG. 6A and FIG. 6B are approximate diagrams of a device for making marks according to a fourth embodiment of the present invention.

As shown in FIG. 6A, in the fourth embodiment, beam shaping means 50 having different properties are used instead of the beam shaping means 40 in FIG. 5A. With this exception, the composition is the same as in FIG. 5A.

The laser beam 31 has a cross-sectional shape 31$b$ which is almost circular in an imaginary plane perpendicular to its optical axis. The beam shaping means 50 shapes the cross-sectional shape 31$b$ of the laser beam 31 and emits a laser beam 51 having a cross-sectional shape 51$b$ whereby the region of light illumination on an imaginary plane perpendicular to its optical axis is a circular ring shape. In other words, the light intensity in the central region of the laser beam 51 is virtually zero. Desirably, no energy loss occurs, so that the total energy of the laser beam 51 is almost equal to the total energy of the laser beam 31 before shaping.

The laser beam 51 having a ring-shaped cross-section of this kind is focused into a very small region 33 of the object 30 under processing. Increase in the light intensity in the central region of the laser beam 51 can be restricted and the light intensity can be controlled such that it exceeds the threshold value only in a small region in the direction of the optical axis.

In order to focus the laser beam in a smaller region in the depth direction of the object 30 under processing, desirably, a lens having as large a numerical aperture as possible is used as the object lens of the condenser optics system 23.

Figure 6B:
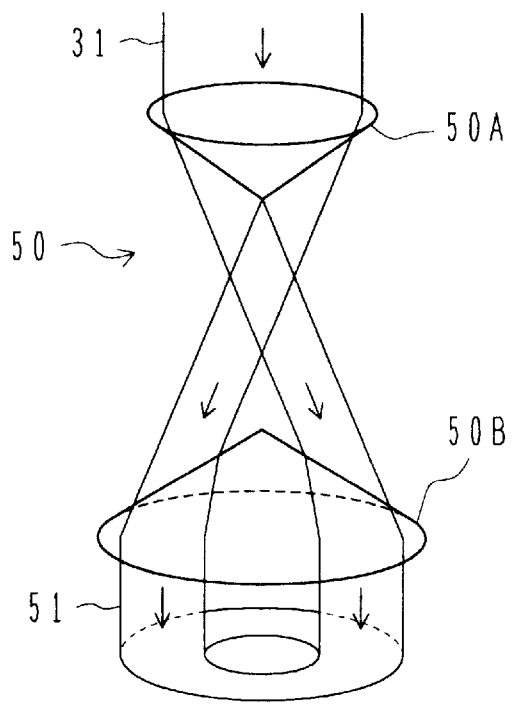

FIG. 6B shows one example of the composition of beam shaping means 50 used in the fourth embodiment. Beam shaping means 50 comprises a first conical prism 50A and a second conical prism 50B. The first and second conical prisms 50A and 50B are positioned such that they share a common central axis and their respective apices are mutually opposing.

In FIG. 5B, the gap between the first conical prism 40A and the second conical prism 40B was adjusted such that the light rays on the outer sides of the laser beam 31 were incident at the region of the apex of the second conical prism 40B, but in FIG. 6B, the gap between the first and second conical prisms is made larger. Therefore, the laser beam 51 emitted from the second conical prism 50B has a circular ring-shaped cross-section. In this way, it is possible to obtain a laser beam having a circular ring-shaped cross-section from a laser beam having a circular cross-section.

FIGS. 6A and 6B relate to a case where a laser beam having a circular ring-shaped cross-section is obtained from a laser beam having a circular cross-section, but it is also possible to use a laser source which outputs a laser beam having a circular ring-shaped cross-section initially.

Figure 7A:
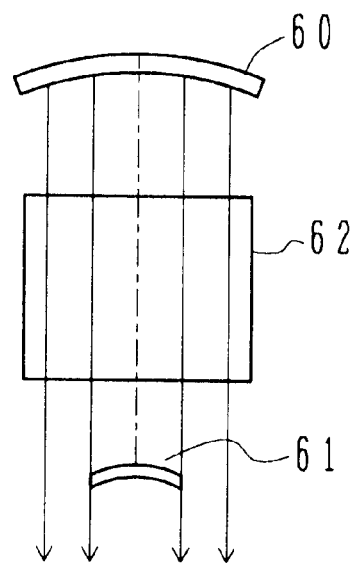
FIG. 7A and 7B are approximate diagrams showing an example of the composition of the fourth embodiment.

FIG. 7A shows an approximate sectional view of one example of a laser source which outputs a laser beam having a circular ring-shaped cross-section. An optical resonator is constituted by a concave mirror 60 and a convex mirror 61 having a smaller diameter than the concave mirror 60. The optical resonator is an unstable optical resonator which is composed such that light rays passing back and forth inside the resonator leak externally past the edges of the convex mirror 61 after travelling back and forth a certain number of times.

A lasing medium 62 is provided inside the optical resonator. Stimulated emission is generated in the lasing medium 62 and lasing occurs. Having travelled back and forth in the optical resonator a prescribed number of times, the laser beam is then emitted externally past the edges of the convex mirror 41. The cross-sectional shape of the laser beam in the direction perpendicular to its optical axis is a circular ring shape.

FIGS. 6A and 6B relate to a case where beam shaping means 50 for shaping a circular ring-shaped laser beam 31 and a condenser optics system 23 for focusing a laser beam 51 are constituted by different optics systems, but it is also possible to constitute these by means of a single optics system.

Figure 7B:
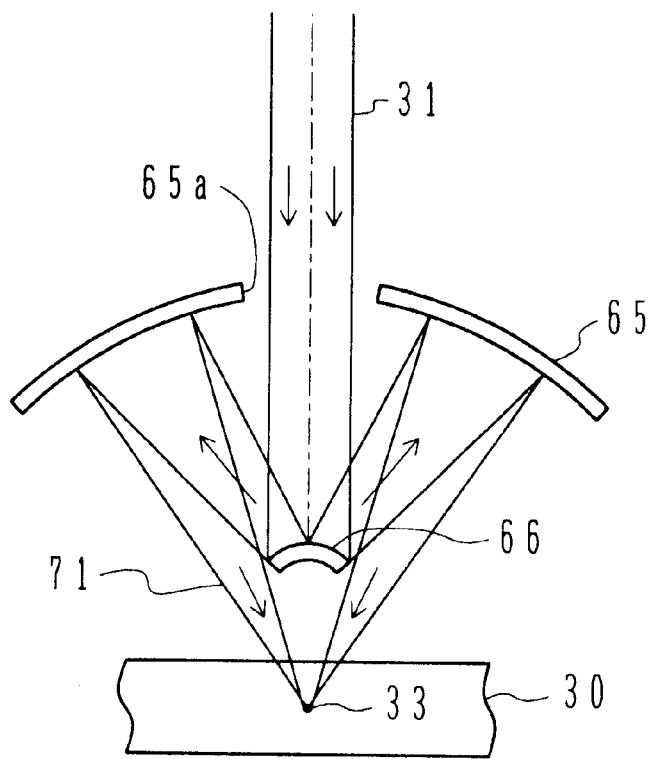

FIG. 7B shows one example of an optics system which combines both the function of beam shaping means 30 and the function of the condenser optics system 23. A large diameter concave mirror 65 and a small diameter convex mirror 66 are positioned such that they share a common central axis, and a Schwartzschild reflective optics system is constituted thereby. A through hole 65a is provided in the centre of the concave mirror 65 and a laser beam 31 passes through this through hole 65a and is incident on the convex mirror 66.

The laser beam 31 incident on the convey mirror 66 is reflected by the convex mirror 66 and the concave mirror 65 and becomes a convergent laser beam 71, which is focused on a very small region 33 of the object 30 under processing. The cross-sectional shape of the convergent laser beam 71 in an imaginary plane perpendicular to its optical axis is a circular ring shape. By using a Schwartzschild reflective optics system, the cross-sectional shape of the laser beam is formed into circular ring shape, and moreover, a convergent laser beam can be formed.

Next, modifications of the third embodiment are described with reference to FIGS. 8A to 8C. These modifications can also be applied to the second and fourth embodiments.

Figure 8A:
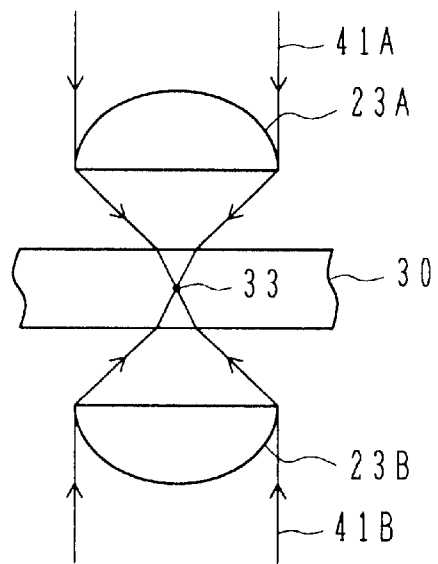
FIG. 8A–FIG. 8C are approximate diagrams of a device for making marks according to a modification of the third embodiment.

As shown in FIG. 8A, if the object 30 under processing is plate shaped, then at the same time as a laser beam 41A is focused from the surface of the object 30 towards a very small region 33 thereof, a laser beam 41B is also focused from the rear side thereof. Therefore, condenser optics system 23A and 23B are provided respectively at the front side and the rear side of the object 30 under processing.

It is not necessary for the laser beam 41A directed from the front side to have the same optical axis as the laser beam 41B directed from the rear side. One or both of the laser beams may be directed at an oblique angle. Furthermore, the number of laser beams is not limited to two, and three or more laser beams may also be focused onto the very small region 33.

Figure 8B:
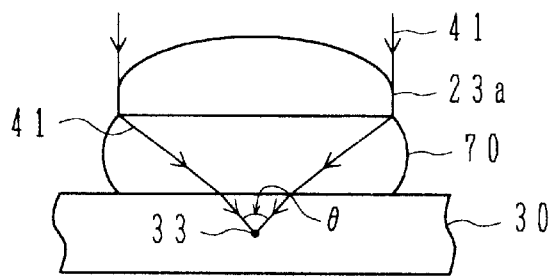

As shown in FIG. 8B, a liquid 70 may be filled into the space between the object lens 23a of the condenser optics system 23 and the surface of the object 30 under processing. A liquid which is transparent at the wavelength of the laser beam used, such as water, for example, can be used as this liquid 70. Since the refractive index of a liquid is generally greater than the refractive index of air, it is possible thereby to reduce the difference in refractive index at the surface of the object 30 under processing. Consequently, it is possible to increase the angle of convergence θ in the object 30 under processing, compared to a case where no liquid 70 is filled into the space. By increasing the angle of convergence, the region where the threshold value is exceeded in the vicinity of the very small region 33 can be further localized.

Figure 8C:
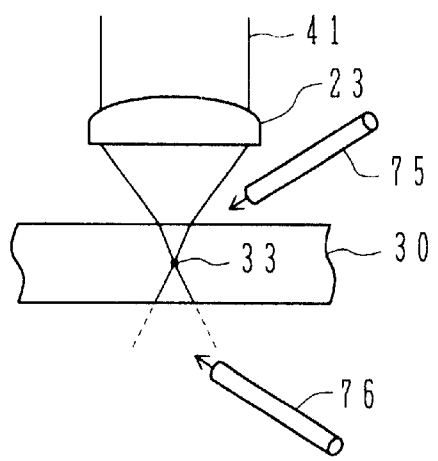

As shown in FIG. 8C, it is also possible to blow a gas, such as clean air, or the like, from gas blowing means 75 onto the region of the surface of the object 30 under processing where the laser beam 41 is incident, during laser illumination. The adhesion of dirt onto the surface of the object 30 under processing can be suppressed by blowing gas in this way.

Moreover, it is also possible to blow a liquid, such as water, onto the region where the laser beam 41 is emitted at the rear face of the object 30 under processing, and the vicinity thereof, during laser illumination. Reflection of the laser beam at the rear face can be suppressed by blowing water in this way. Furthermore, cooling efficiency is increased.

Next, a method for inspecting marked regions is described with reference to FIG. 9.

Figure 9:
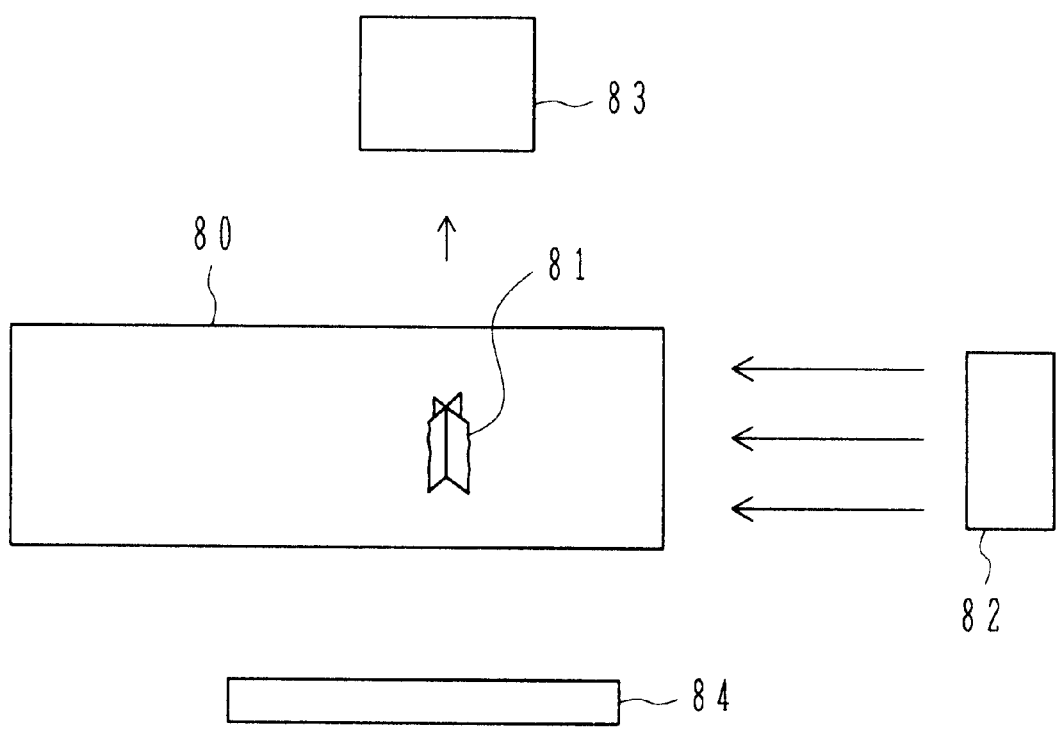
FIG. 9 is and approximate diagram for describing a method for observing marks in a glass substrate.

FIG. 9 is an approximate diagram for describing a method for inspecting marked regions. A mark 81 is formed by a crack in the inner portion of a glass substrate 80. Illumination means 82, such as a xenon lamp, or the like, illuminates light onto the inside of the glass substrate 80 from one end thereof. The illumination light incident on the inner portion of the glass substrate 80 is scattered by the mark 81. The scattered light is received by light-receiving means 83, such as a CCD camera, positioned on the side of one surface of the glass substrate 80, and the mark 81 is observed.

A low-reflection plate 84 is placed on the side of the other surface of the glass substrate 80, such that it covers the field of view of the light-receiving means 83. The low-reflection plate 84 is made from a black plate-shaped material, for example.

In the composition shown in FIG. 9, since illumination light is incident on the inner portion of the glass substrate 80 from the end thereof, illumination light which is transmitted through the glass substrate 80 does not enter the light-receiving means 83. In other words, it is almost only scattered light which enters the light-receiving means 83. Conversely, if illumination light is directed onto the glass substrate 80 from the rear face thereof, the light transmitted through the glass substrate 80 will enter the light-receiving means 83. Therefore, the S/N ratio will fall.

Upon detailed observation of the mark formed by laser illumination, it was found that a planar crack containing the optical axis of the laser beam illuminated onto the substrate had been formed. Therefore, it was difficult to observe the mark 81 by irradiating illumination light from the rear face of the glass substrate 80. By adopting a composition as shown in FIG. 9, the mark 81 could be observed in conditions providing a good S/N ratio.

Furthermore, since the background is covered by a low-reflection plate 84, the background is dark and the S/N ratio is further enhanced. The low-reflection plate 84 may also be formed by a black body.

FIG. 9 related to a case where illumination light is shined from one end of the glass substrate 80, but it is also possible to shine the illumination light from another direction in such a way that light transmitted through the glass substrate 80 does not enter the light-receiving means 83. Moreover, by using a pulse flash tube synchronized to the CCD camera, the S/N ratio may be increased yet further.

Next, a fifth embodiment is described with reference to FIG. 10A and 10B–FIG. 14. The device for making marks used in the fifth embodiment is similar to the device used in the first embodiment illustrated in FIG. 1. A laser beam is focused on the inner portion of the object 1 to be processed in a similar manner to the first embodiment, as shown in FIG. 2. The point of difference with respect to the first embodiment is that the energy per pulse of laser beam Is reduced. Since the energy of the laser beam is reduced, the occurrence of optical damage or optical breakdown is restricted, and it is possible to create changes in the optical properties (refractive index) of the glass substrate 1. A line-shaped mark having changed optical properties is formed in the glass substrate 1.

Figure 10A:
FIG. 10A and FIG. 10B are respectively a plan view and a side view of marks fabricated by the method according to the fifth embodiment.
Figure 10B:
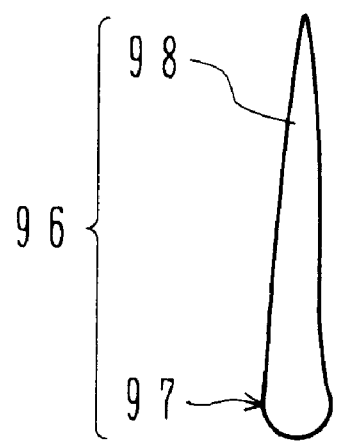

FIG. 10A is a diagram of a mark 96 formed by the method for making marks according to the fifth embodiment, as viewed from the normal direction to the substrate, and FIG. 10B is a diagram thereof as viewed from the side of the substrate. When the mark 96 is viewed from the normal direction to the substrate, the mark 96 appears to be virtually round in shape. When viewed from the side of the substrate, it is almost indistinguishable. This is thought to be because the change in optical properties is very slight, and therefore the thin line-shaped mark 96 cannot be distinguished from the side. When the mark 96 is viewed from the normal direction to the substrate, the change in optical properties is multiplied along the longitudinal direction of the mark 96, so it becomes visible.

When the mark 96 was observed carefully from the side of the substrate, it was found that a spherical lump-shaped region 97 was formed in the deeper portion of the glass substrate, and a line-shaped region 98 was formed extending from this end region 97 towards the side on which the laser beam was incident. The position of the lump-shaped region 97 is thought to correspond to the focal point of the laser beam.

Marks were made in soda lime glass substrates 1.1 mm thick and 0.7 mm thick. The laser beam used was a fourth harmonic of an Nd:YLF laser, and the beam diameter was approximately 10 mm, the energy was 100 $\mu$J/pulse, and the focal length of the fθ lens 14 was 28 mm. When marks were made under these conditions, it was possible to induce changes in the refractive index of the glass at the focal point, without causing cracks to occur.

It was also possible to make marks in non-alkaline glass substrates 1.1 mm, 0.7 mm and 0.4 mm thick, under the same conditions, without causing cracks to occur.

FIG. 11 is a diagram showing different marks formed by changing the energy per pulse of laser beam and the number of shots directed onto one point of the object to be marked, as viewed from the normal direction to the substrate. The laser beam used was a Ti:sapphire laser having a pulse width of approximately 100 fs and a central wavelength of 800 nm, and the numerical aperture of the fθ lens was 0.28. The object to be marked was a soda lime glass. The number of shots directed onto one point was set to 1000, 125 and 8 shots. The energy per pulse was set to 70 $\mu$J, 7 $\mu$J and 0.7 $\mu$J. A plurality of marks spaced 50 $\mu$m apart were formed under these conditions.

Figure 12:
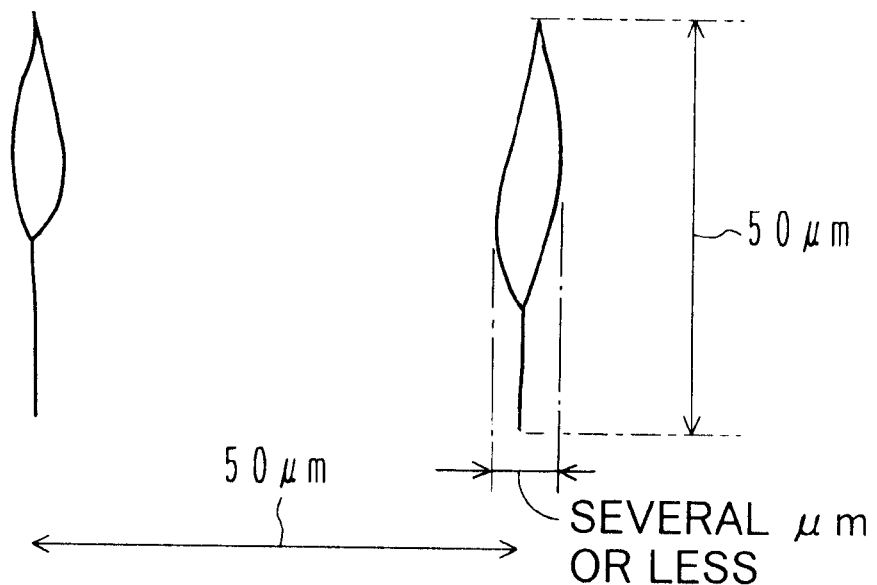
FIG. 12 is a side view of a mark obtained by marking by 8 shots.

When the per pulse energy was 70 $\mu$J, a crack was generated, regardless of the number of shots. FIG. 12 is a diagram showing a mark formed when the per pulse energy was 70 $\mu$J and the number of shots was 8, as viewed from the side of the substrate. A crack extending in the thickness direction of the substrate has been generated. The length of this crack was approximately 50 $\mu$m and the thickness was several $\mu$m or less.

Figure 13:
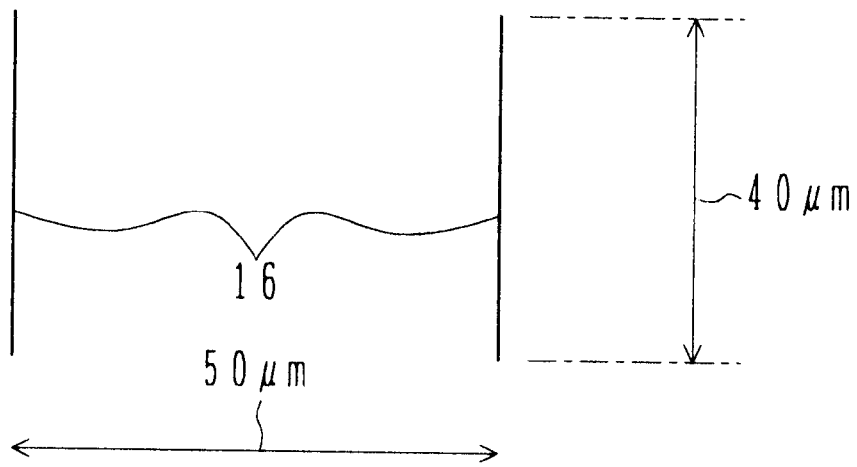
FIG. 13 is a side view of a mark obtained by marking by 1000 shots a laser beam per pulse energy of 7 $\mu$j.

When the per pulse energy was set to 7 $\mu$J or 0.7 $\mu$J, no generation of cracks was observed, even when 1000 shots were directed at the same point. FIG. 13 is a diagram of a mark formed when the per pulse energy was set to 7 $\mu$J and the number of shots was set to 1000, as viewed from the side of the substrate. No crack has been generated, but a narrow mark 96 is formed extending in the thickness direction of the substrate by a long thin region where the optical properties have changed. The length of each mark 96 was approximately 40 $\mu$m.

Thus, it can be seen that the occurrence of cracks is dependent on the energy per pulse of the laser beam.

Moreover, it was discovered that at uniform per pulse energy, the degree of optical change was less, the smaller the number of shots. If the per pulse energy is set to a level which does not generate cracks, easily distinguishable marks can be formed by increasing the number of shots.

It was found that when making marks using a laser beam having a 1–1000 ns pulse width, the pulse energy must be reduced if marks due to change in the refractive index are to be made without generating cracks. However, if the pulse energy is low, the refractive index change is small, and therefore it is difficult to fabricate highly visible marks. In order to make highly visible marks, desirably, a laser having a short pulse width is used. Using a laser having a short pulse width is also advantageous from the viewpoint of industrial application, since it broadens the tolerance range of the per pulse energy. It is especially desirable to use a laser having a pulse width of approximately 1 fs–1000 fs.

Generally, the amount of fluctuation in the per pulse laser energy is estimated to be approximately ±5%. The relationship between the threshold value T1 of the per pulse energy and the threshold value T2 at which optical damage is caused is considered to be T1<T2. If the difference between the threshold values T1 and T2 is small, then it is difficult to maintain the per pulse laser energy at a level below the threshold value T1, and consequently, in practical use, marks are made in the vicinity of the energy T1.

If the energy exceeds the threshold value T2, cracks are generated. However, compared to a case where marks are made using a laser having an energy greater than T2, the size of the cracks can be reduced. Therefore, even if cracks occur, it is possible to prevent them from developing as far as the surface of the object under processing.

Figure 14:
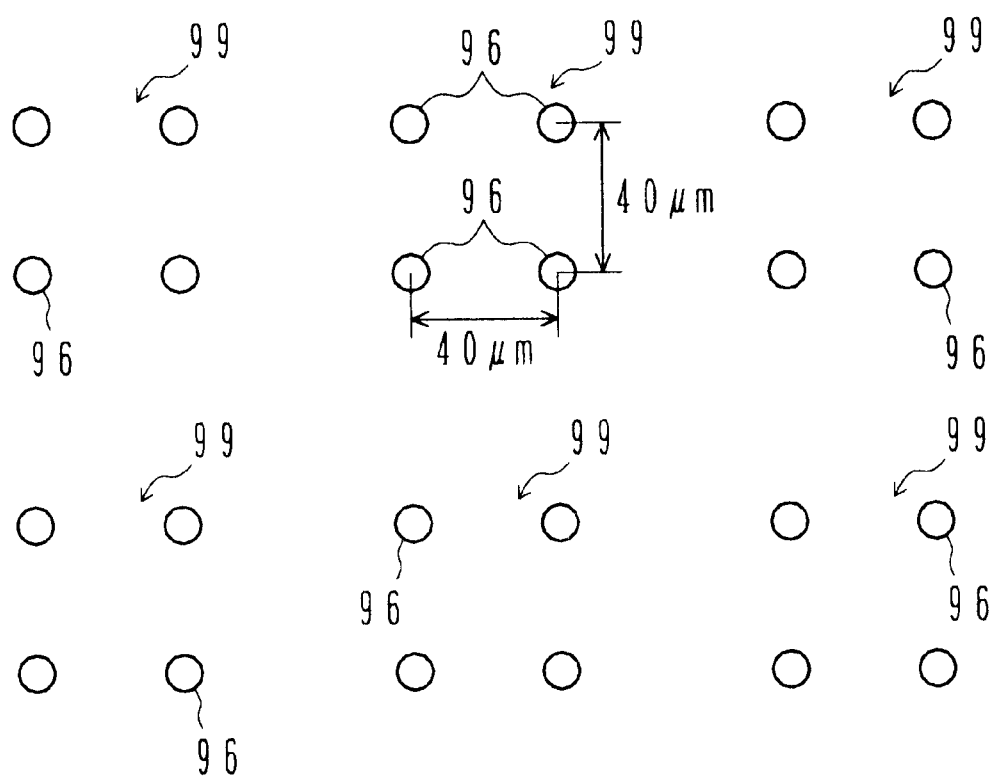
FIG. 14 is a plan view showing the positions of respective marks in a case where marking units are composed by arranging a plurality of marks.

FIG. 14 is a plan view of objects to be marked in a case where a plurality of marks 96 are formed using the method according to the fifth embodiment. Marks 96 are located in positions corresponding to the four corners of a square having sides 40 μm long, and each four marks constitute a single marking unit 99.

Even in cases where the marks 96 are difficult to see individually, by constituting a single marking unit 99 by a collection of plural marks 96, the marks can be made more readily visible.

Above, the present invention was described by means of embodiments, but the present invention is not limited to these embodiments. For example, it will be evident to someone operating in this field that various modifications, improvements, combinations, and the like, are possible.

What is claimed is:

1. A method for making marks comprising the steps of:
preparing an object to be marked; and
making marks on an inner portion of the object to be marked by focusing a laser beam of a wavelength that is transmitted by a material from which said object to be marked is formed;
wherein a depth from a surface of the object to be marked to a focal point of the laser beam is controlled such that the focal point of the laser beam is positioned at the inner portion of the object to be marked, taking into consideration a refractive index of the material from which the object to be marked is formed;
wherein the marks comprise cracks generated by focusing the laser; and
wherein the object to be marked has a thickness of at most 2 mm.

2. The method for making marks according to claim 1,
wherein the laser beam is emitted from a laser source and split into a plurality of laser beams; and
wherein the split plurality of laser beams are focused onto a very small region of the inner portion of the object to be marked so as to cause degeneration of the very small region of the object to be marked.

3. The method for making marks according to claim 1,
wherein the laser beam has a distribution of light intensity such that the light intensity increases with distance from a center of the laser beam in an imaginary plane perpendicular to an optical axis thereof; and
wherein the laser beam is focused on the inner portion of the object to be marked so as to cause degeneration of the inner portion of the object to be marked.

4. The method for making marks according to claim 1,
wherein the laser beam has a circular ring-shaped cross-section perpendicular to an optical axis thereof; and
wherein the laser beam is focused on the inner portion of the object to be marked so as to cause degeneration of the inner portion of the object to be marked.

5. A method for making marks comprising the steps of:
preparing an object to be marked; and
making marks on an inner portion of the object to be marked by focusing a laser beam of a wavelength that is transmitted by a material from which said object to be marked is formed;
wherein a depth from a surface of the object to be marked to a focal point of the laser beam is controlled such that the focal point of the laser beam is positioned at the inner portion of the object to be marked, taking into consideration a refractive index of the material from which the object to be marked is formed;
wherein the laser beam comprises a plurality of laser beams, and the object to be marked comprises a plate-shaped material having a surface and a rear face;
wherein a portion of the plurality of laser beams are irradiated onto the plate-shaped material from the surface thereof, and a remainder of the plurality of laser beams are irradiated onto the plate-shaped material from the rear face thereof;
wherein the laser beams are focused at a very small region of the inner portion of the plate-shaped material so as to cause degeneration of the very small region of the inner portion of the plate-shaped material; and
wherein the object to be marked has a thickness of at most 2 mm.

6. A method for making marks comprising the steps of:
preparing an object to be marked; and
making marks on an inner portion of the object to be marked by focusing a laser beam of a wavelength that is transmitted by a material from which said object to be marked is formed;
wherein the object to be marked is plate-shaped, and the laser beam is focused at a position deeper than a central point of the object to be marked in a thickness direction thereof;
wherein the marks comprise cracks generated by focusing the laser; and
wherein the object to be marked has a thickness of at most 2 mm.

7. The method for making marks according to claim 6,
wherein the laser beam has a distribution of light intensity such that the light intensity increases with distance from a center of the laser beam in an imaginary plane perpendicular to an optical axis thereof; and
wherein the laser beam is focused on the inner portion of the object to be marked so as to cause degeneration of the inner portion of the object to be marked.

8. The method for making marks according to claim 6,
wherein the laser beam has a circular ring-shaped cross-section perpendicular to an optical axis thereof; and
wherein the laser beam is focused on the inner portion of the object to be marked so as to cause degeneration of the inner portion of the object to be marked.

9. A method for making marks comprising:
preparing an object to be marked; and
making marks on an inner portion of the object to be marked by focusing a laser beam of a wavelength that is transmitted by a material from which said object to be marked is formed;
wherein the object to be marked is plate-shaped, and the laser beam is focused at a position deeper than a central point of the object to be marked in a thickness direction thereof;

wherein the laser beam is emitted from a laser source and split into a plurality of laser beams; and wherein the split plurality of laser beams are focused onto a very small region of the inner portion of the object to be marked so as to cause degeneration of the very small region of the object to be marked.

* * * * *